June 5, 1956  A. J. WAYMAN  2,749,068
HANGER CLAMPS
Filed Feb. 12, 1953

INVENTOR.
ALBERT J. WAYMAN
BY
Ralph B. Stewart
ATTORNEY

# United States Patent Office 2,749,068
Patented June 5, 1956

2,749,068

HANGER CLAMPS

Albert J. Wayman, East Palestine, Ohio

Application February 12, 1953, Serial No. 336,487

3 Claims. (Cl. 248—72)

This invention relates to hanger clamps of the type designed especially for supporting electrical conduits or cables from a fixed structural element such as an I-beam.

Broadly my invention involves a hanger ring for receiving the pipe or cable to be suspended, and a novel clamp for securing the hanger ring to the flange of an I-beam or other suitable support.

A broad object of the invention is to devise a hanger structure involving a hanger ring and a supporting clamp therefor, the clamp being designed so that the ring may be supported with its axis arranged in different angular positions with respect to the axis of the supporting beam or member.

Two forms of my invention are illustrated in the accompanying drawing, in which

Figure 1:
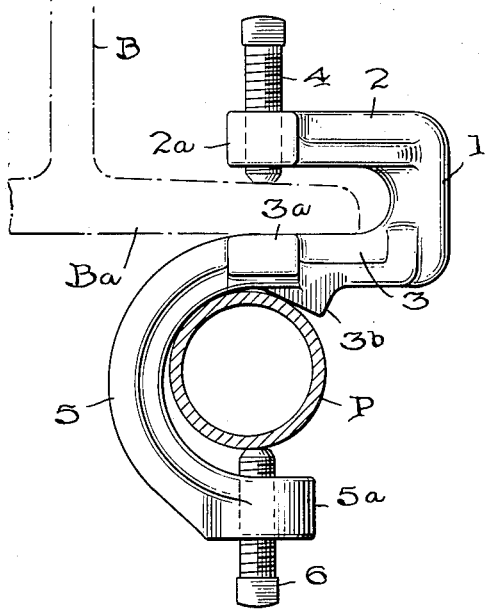
Figure 1 is a side elevational view of one form of hanger clamp supporting a pipe or conduit in the hanger ring and being clamped to the lower flange of an I-beam with the axis of the ring being parallel with the axis of the I-beam.

The hanger clamp in both forms of my invention comprise a C-clamp formed of a yoke portion 1 and two arms 2 and 3 extending away from the yoke portion in parallel relation, the outer end portions of the arms shown at 2a and 3a and forming the jaw portion of the clamp being bent at right angles to the plane of the loop portion of the clamp which is formed of yoke portion 1 and arm sections 2 and 3. A clamping screw 4 is threaded through the outer end portion, 2a, near the end thereof, and is arranged in clamping relations with the opposite arm portion 3a.

Figure 2:
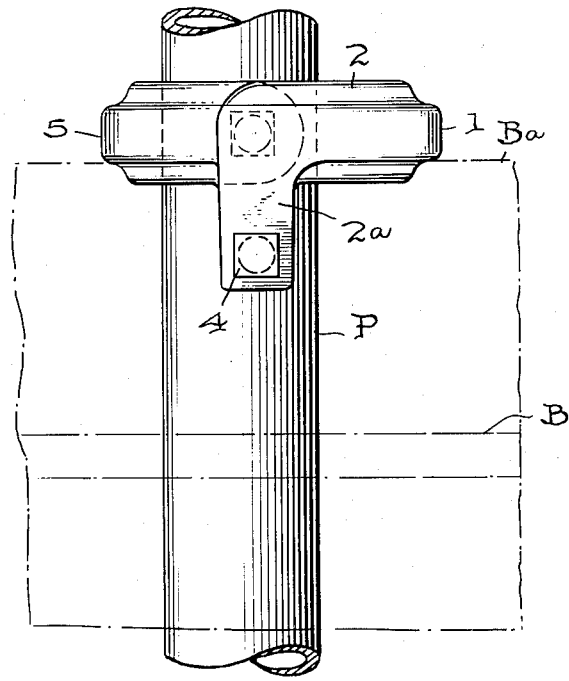
Figure 2 is a top view of Figure 1 showing the clamp applied to the I-beam at right angles to the position shown in Figure 1.

In Figures 1 and 2, the hanger ring is formed of a C-shaped extension 5 of the main part of the arm 3 arranged in the plane of the loop portion of the C-clamp. This forms a broken ring to permit the insertion of a pipe or conduit P through the open part of the ring. The pipe P is clamped within the ring by means of a screw 6 which is threaded through the end portion 5a of the ring 5. An inclined abutment 3b is formed on the lower face of the main portion of the arm 3 to provide a seat for pipe P. By this arrangement the pipe P is supported within the hanger ring at three points, that is, at the point of screw 6, at a point on the abutment 3b, and at a point on the inside of the upper portion of the extension 5.

In Figure 1 the hanger clamp is shown clamped to the lower flange Ba of an I-beam having a web portion shown at B, and it will be noted that the plane of the loop section of the clamp is at right angles to the longitudinal axis of the beam so that the pipe P is supported parallel with the beam.

Where it is desired to support the pipe at right angles to the axis of the beam, the clamp is secured to the flange Ba of the I-beam in the mannear shown in Figure 2, where it will be seen that the plane of the loop section of the clamp is parallel to the axis of the beam and only the jaw section of the clamp embraces the beam flange. Obviously, the pipe P may be clamped in any other angular position with respect to the I-beam between the parallel position and the 90 degrees position.

Figure 3:
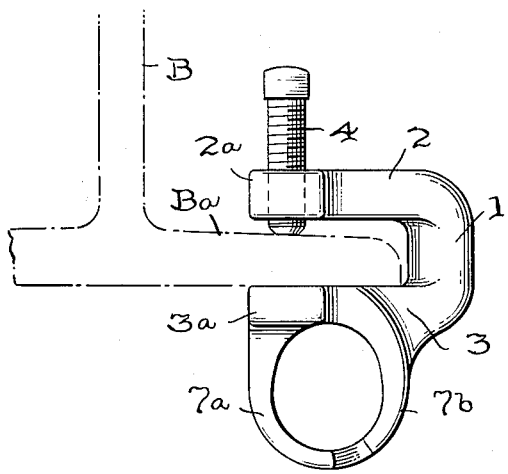
Figure 3 is a side elevational view of a second form of hanger clamp in which the hanger ring is of different form from that shown in Figure 1.
Figure 4:
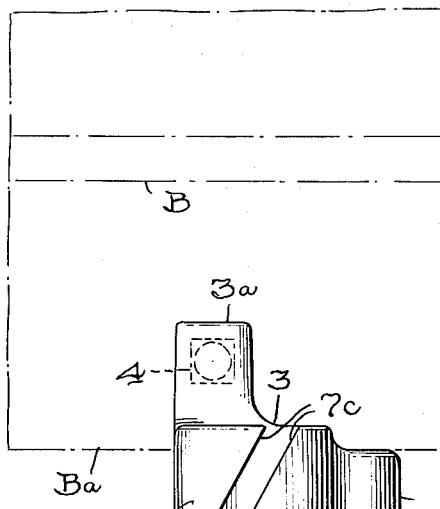
Figure 4 is a bottom view of the clamp shown in Figure 3 illustrating how the clamp may be attached to the I-beam at right angles to the position shown in Figure 3.

The hanger clamp illustrated in Figures 3 and 4 involves the same C-clamp structure as in Figures 1 and 2, but the hanger ring in this case is formed of a split ring comprising two half portions 7a and 7b separated by a slot or gap 7c arranged at an angle to the axis of the ring. This type of ring is designed especially for supporting wires or cables of a diameter which may be passed through the gap 7c, but the ring may be used to support cables or pipes of larger diameter by passing the ends of the cables or pipes through the ring.

The clamp in Figure 3 is clamped to the flange Ba of the I-beam in the same manner as in Figure 1, so that the axis of the ring 7a—7b is parallel with the axis of the beam. In this case the flange of the I-beam is embraced by both the jaw section and the loop section of the C-clamp. Where it is desired to run the cables or pipes at right angles to the axis of the I-beam, the clamp is secured to the flange of the beam in the manner shown in Figure 4 where only the jaw section of the C-clamp embraces the flange of the beam, and the axis of the hanger ring 7a—7b is at right-angles to the axis of the beam. As explained above in connection with Figure 1, any other angular relation between 0° and 90° may be obtained if desired.

What I claim is:

1. A hanger comprising a C-clamp formed of a loop section comprising a yoke portion and two arms extending from said yoke portion in parallel relation, and a jaw section comprising parallel arm-extensions projecting from the ends of said arms at right angles to the plane of said loop section, a clamping screw threaded through the end of one of said arm-extensions and directed towards the end of the other arm-extension, and a hanger ring carried by the loop section of said C-clamp.

2. A hanger according to claim 1 wherein said hanger ring comprises a C-shaped extension of one arm of said C-clamp having its plane arranged in the same plane as the loop section of said C-clamp and facing in the opposite direction, and a clamping screw threaded through the free end of said C-extension.

3. A hanger according to claim 1 wherein said hanger ring is formed of a split-ring comprising two half-ring sections extending outwardly from one arm of said C-clamp in the plane of the loop section of said clamp and having the ends thereof separate by a gap arranged at an angle to the axis of the ring.

References Cited in the file of this patent
UNITED STATES PATENTS

| | | |
|---|---|---|
| 370,386 | Gholson | Sept. 27, 1887 |
| 1,224,309 | Lupke | May 1, 1917 |
| 1,654,383 | Parrish | Dec. 27, 1927 |
| 1,672,720 | Horsfall | June 5, 1928 |